US010215498B2

(12) United States Patent
Kwon et al.

(10) Patent No.: US 10,215,498 B2
(45) Date of Patent: Feb. 26, 2019

(54) AIR GUIDE-INTEGRATED EVAPORATION COOLER AND METHOD FOR MANUFACTURING SAME

(71) Applicant: KYUNGDONG NAVIEN CO., LTD., Pyeongtaek-si (KR)

(72) Inventors: Sung Man Kwon, Incheon (KR); Kyu Cheol Oh, Incheon (KR); Won Jae Jin, Cheongju-si (KR)

(73) Assignee: KYUNGDONG NAVIEN CO., LTD., Pyeongtaek (KR)

( * ) Notice: Subject to any disclaimer, the term of this patent is extended or adjusted under 35 U.S.C. 154(b) by 0 days.

(21) Appl. No.: 15/506,843

(22) PCT Filed: Aug. 28, 2015

(86) PCT No.: PCT/KR2015/009071
§ 371 (c)(1),
(2) Date: Feb. 27, 2017

(87) PCT Pub. No.: WO2016/032283
PCT Pub. Date: Mar. 3, 2016

(65) Prior Publication Data
US 2017/0276434 A1     Sep. 28, 2017

(30) Foreign Application Priority Data

Aug. 29, 2014 (KR) .................. 10-2014-0114178
Aug. 28, 2015 (KR) .................. 10-2015-0121756

(51) Int. Cl.
*F24F 1/00* (2011.01)
*F28D 9/00* (2006.01)
(Continued)

(52) U.S. Cl.
CPC .......... *F28D 9/0093* (2013.01); *F25B 39/022* (2013.01); *F28D 9/0025* (2013.01);
(Continued)

(58) Field of Classification Search
CPC .... F28D 9/0093; F28D 9/0025; F28D 9/0043; F28D 9/005; F28D 9/0056; F28D 9/0075;
(Continued)

(56) References Cited

U.S. PATENT DOCUMENTS 3,587,730 A * 6/1971 Milton .................. F28F 13/187
159/DIG. 28
3,995,689 A * 12/1976 Cates ........................ F28B 1/06
165/166

(Continued)

FOREIGN PATENT DOCUMENTS

JP       08-105697 A       4/1996
JP       08-121986 A       5/1996

(Continued)

OTHER PUBLICATIONS

International Search Report of PCT/KR2015/009071, dated Nov. 26, 2015, English translation.

*Primary Examiner* — Justin M Jonaitis
(74) *Attorney, Agent, or Firm* — STIP Law Group, LLC

(57) ABSTRACT

The purpose of the present invention is to provide an air guide-integrated evaporation cooler which allows a plurality of barrier plates, heat exchangers, and air guides for forming a dry channel and a wet channel to be integrally manufactured by a simple process, and a method of manufacturing the same. The air guide-integrated evaporation cooler for implementing the purpose includes a plurality of barrier plates; and gap units including a plurality of bars positioned between the plurality of barrier plates, disposed to be spaced apart from each other at a center portion thereof, and configured to form heat exchangers, and guides disposed at edges of the plurality of barrier plates and configured to determine a direction of a fluid flow.

12 Claims, 6 Drawing Sheets

(51) Int. Cl.
*F28F 3/02* (2006.01)
*F28F 3/04* (2006.01)
*F28F 9/02* (2006.01)
*F25B 39/02* (2006.01)
*F28D 21/00* (2006.01)
*F28F 13/04* (2006.01)
*F28F 21/08* (2006.01)

(52) U.S. Cl.
CPC ......... *F28D 9/0031* (2013.01); *F28D 9/0062* (2013.01); *F28D 9/0068* (2013.01); *F28D 21/0014* (2013.01); *F28F 3/025* (2013.01); *F28F 3/04* (2013.01); *F28F 9/0268* (2013.01); *F28F 13/04* (2013.01); *F28F 21/084* (2013.01); *F24F 2001/0092* (2013.01); *F25B 2339/023* (2013.01); *F28D 2021/0064* (2013.01); *F28F 2245/02* (2013.01); *F28F 2275/04* (2013.01)

(58) Field of Classification Search
CPC .... F28D 1/0308; F28D 9/0006; F28D 9/0031; F28D 9/0037; F28D 9/0062; F28D 9/0081; F28D 9/00; F28D 7/00; F28F 3/04; F28F 13/04; F28F 3/086; F28F 3/02; F28F 3/08; F28F 3/083; F28F 3/005
USPC .................................. 165/167, 166, 165, 164
See application file for complete search history.

(56) References Cited

U.S. PATENT DOCUMENTS

| | | | | |
|---|---|---|---|---|
| 4,966,230 | A * | 10/1990 | Hughes | F28D 1/035 165/150 |
| 5,222,551 | A * | 6/1993 | Hasegawa | F25B 40/00 165/166 |
| 5,369,964 | A * | 12/1994 | Mauer | F24F 3/1405 165/104.17 |
| 5,447,194 | A * | 9/1995 | Hayashi | B60H 1/3227 165/149 |
| 5,514,248 | A * | 5/1996 | Okuda | F25B 39/022 159/28.6 |
| 2002/0124999 | A1* | 9/2002 | Chiba | F28D 1/0333 165/153 |
| 2003/0098145 | A1* | 5/2003 | Tada | F28F 19/04 165/166 |
| 2009/0178426 | A1* | 7/2009 | Bhatti | F25B 39/04 62/304 |

FOREIGN PATENT DOCUMENTS

| | | |
|---|---|---|
| JP | 2000-304475 A | 11/2000 |
| JP | 2006-071150 A | 3/2006 |
| JP | 2014-031898 A | 2/2014 |
| JP | 5747879 B | 7/2015 |
| KR | 10-1055668 A | 5/2010 |
| KR | 10-2012-0091775 A | 8/2012 |
| KR | 10-1368309 B | 2/2014 |

* cited by examiner

【Fig. 1】
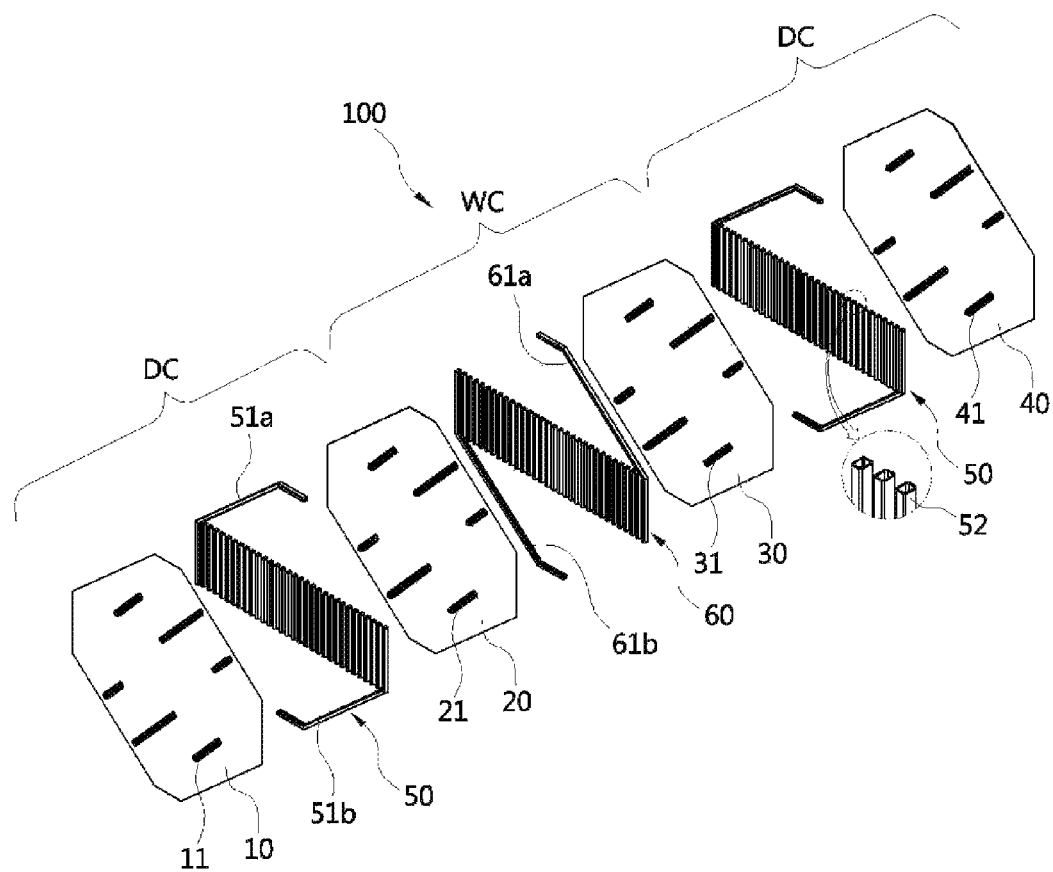

[Fig. 2]
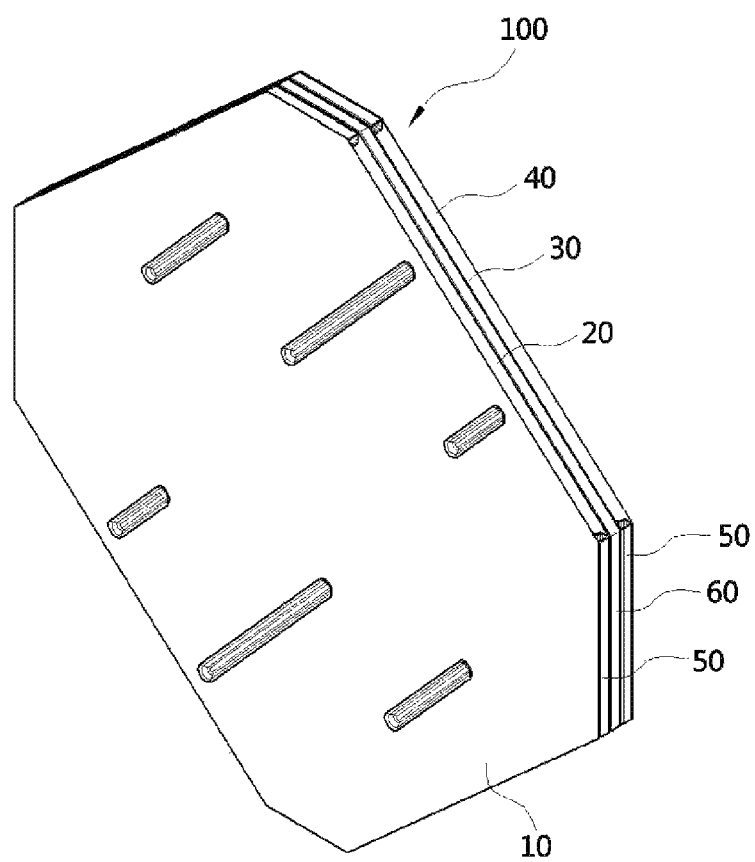

[Fig. 3A]
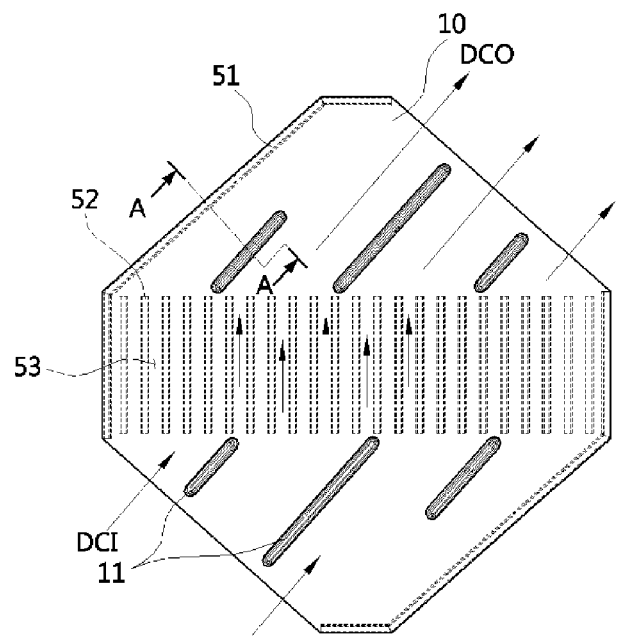
[Fig. 3B]
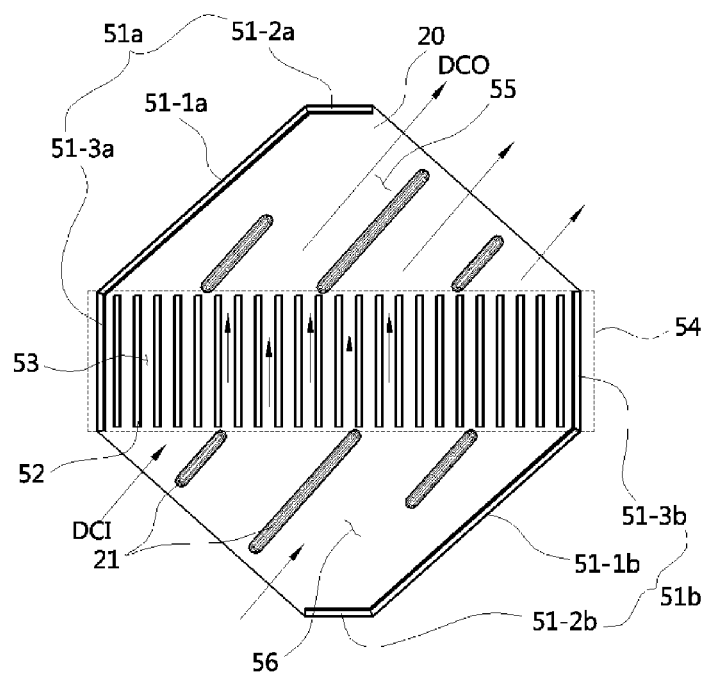

[Fig. 4]
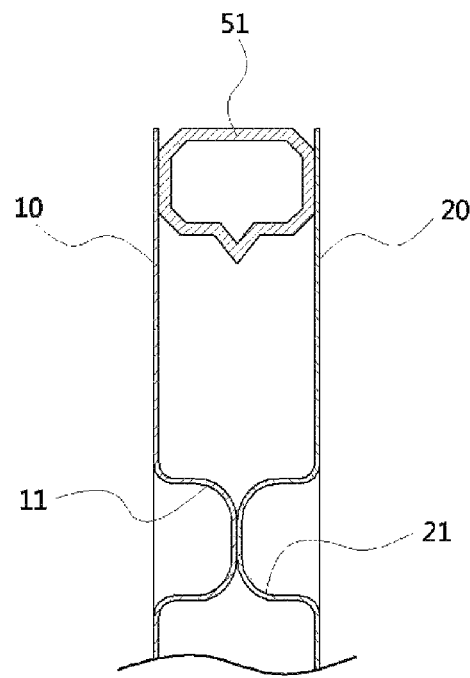
[Fig. 5]
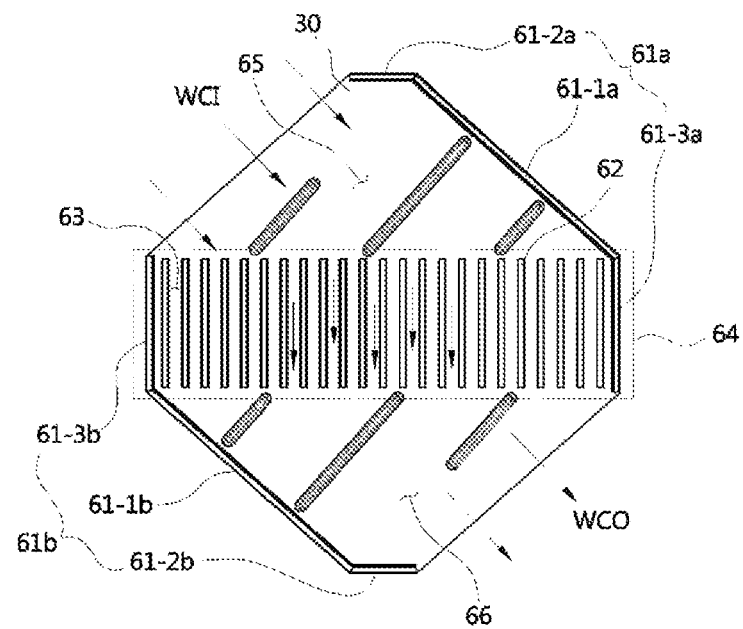

[Fig. 6]
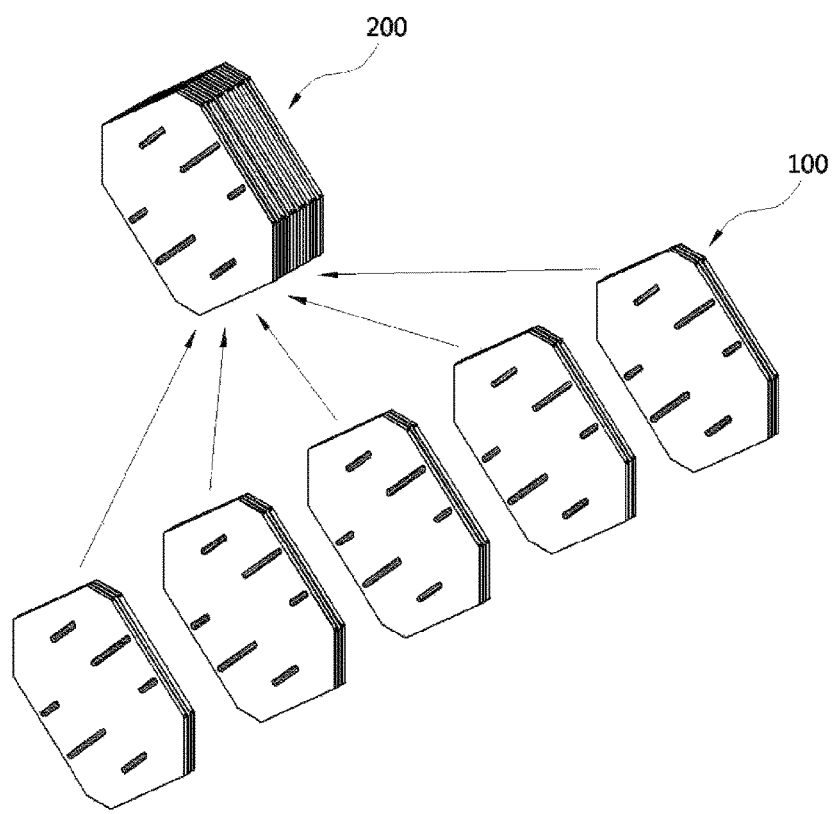

[Fig. 7]
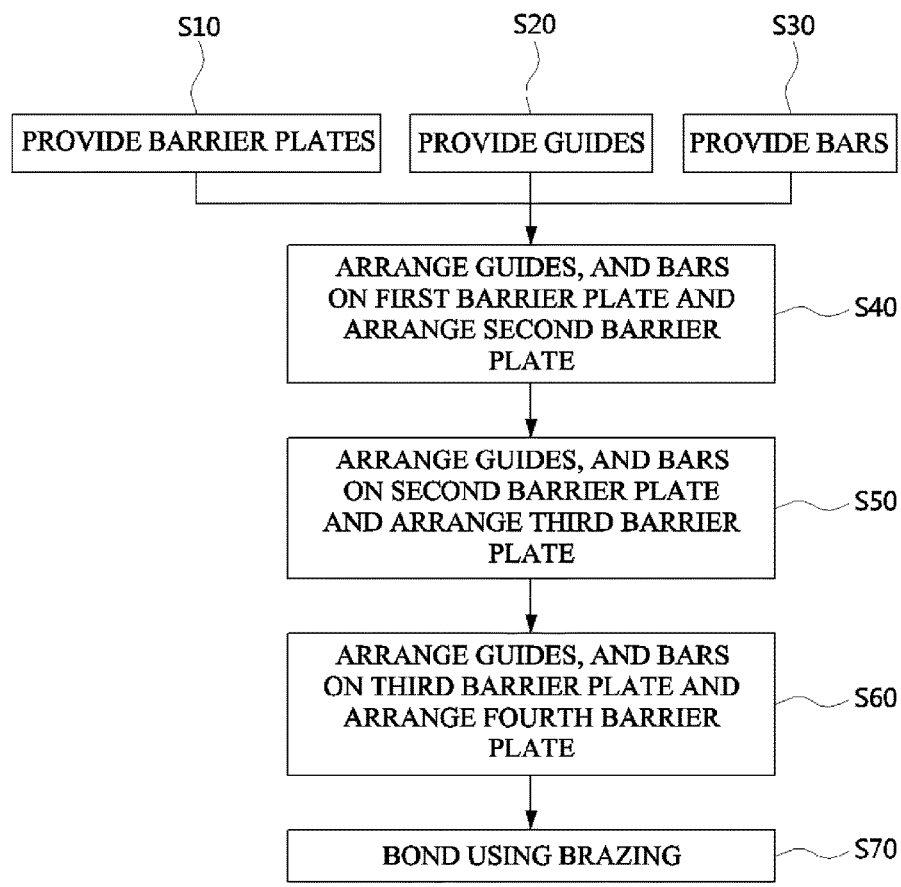

AIR GUIDE-INTEGRATED EVAPORATION COOLER AND METHOD FOR MANUFACTURING SAME

CROSS-REFERENCE TO RELATED APPLICATIONS

This application is the U.S. National Phase under 35 U.S.C. § 371 of International Application No. PCT/KR2015/009071 filed on Aug. 28, 2015, which in turn claims the benefit of Korean Applications No. 10-2014-0114178 filed on Aug. 29, 2014 and No. 10-2015-0121756 filed on Aug. 28, 2015, the disclosures of which are incorporated by reference into the present application.

TECHNICAL FIELD

The present invention relates to an air guide-integrated evaporation cooler and a method of manufacturing the same, and more particularly, to an air guide-integrated evaporation cooler which is applicable to an evaporating type cooling and dehumidifying apparatus and a method of manufacturing the same.

BACKGROUND ART

Air conditioners, which are generally used as cooling and dehumidifying apparatuses, use refrigerants and are identified as a main cause of ozone depletion and global warming due to refrigerant leakage. In consideration of a problem of using such a refrigerant, energy ventilators which reduce a ventilation load by transmitting sensible heat and latent heat between discharged indoor air and suctioned outdoor air have been developed.

However, because a latent heat recovery rate is remarkably lower than a sensible heat recovery rate in conventional ventilators, there is a problem in that the conventional ventilators cannot respond to an increase in a cooling load. In consideration of such a conventional energy ventilator, regenerative evaporating type cooling technology has been developed.

The regenerative evaporating type cooling technology reduces air temperature using a cooling effect of water evaporation, can solve the problem of the conventional air conditioner because the technology does not use refrigerants except water, and can have an advantageous for sufficiently reducing a cooling load.

A cooler applied to such a regenerative evaporating type cooler is formed with continuously consecutively repeating wet channels and dry channels. Indoor air and outdoor air are mixed and pass through the dry channel, some air which has passed though the dry channel is exhausted through the wet channel wetted by water, and thus the water is induced to be evaporated. When the water evaporates from a surface of the wet channel, the surface of the wet channel is cooled and absorbs heat of the air which passed through the dry channel, and thus the air which has passed through the dry channel is cooled and supplied to the interior. In order to increase a contact area of a portion of the dry channel and the wet channel at which heat is exchanged, fins bent a plurality of times are used.

Here, the wet channel to which the exhausted air and water are supplied and the dry channel which supplies cooled air, should be completely separated from each other. To this end, air guides used for the wet channel and the dry channel are installed at a lower portion and an upper portion of structures formed with the alternately repeating wet channels and dry channels.

As such an example, in Korean Patent Registration No. 10-1055668, a structure includes a unit module (a heat exchanger in the present invention) in which a dry channel and a wet channel are repeatedly arranged and bonded and a wet channel guide duct which is formed at an outlet side of the wet channel and separates exhausted air from indoor air, and further includes a coupling unit which inserts the guide duct (an air guide in the present invention) into an inside or outside of the wet channel.

However, in a method in which the dry channel and the wet channel are separately formed and bonded to each other to form the unit module and an air guide is coupled to an upper and a lower portion of the unit module, because each of the components is manufactured individually and a process for assembling the components is required, there may be a problem in that a manufacturing cost increases, and particularly, cooling efficiency decreases because water leaks between the unit module and the air guide or exhausted air in the wet channel and indoor air in the dry channel are mixed.

Particularly, as the dry channel and the wet channel include fins of which cross section has a wave shape (bent a plurality of times), problems that the fins will be difficult to manufacture and a manufacturing cost thereof will be large may be predicted.

In addition, in Korean Patent No. 10-1207551, a structure in which a heat exchanging body formed of a metal material and a guide member formed of a synthetic resin are coupled was disclosed. Although a sealing member has to be applied between the heat exchanging body and the guide member of the structure to prevent water and air leaks, assembling the sealing member is not easy, and although the sealing member is applied thereto, sealing is difficult to keep, and evaporation water leaked through an assembly unit of the guide member is introduced to a dehumidifying rotor in a system and thus a cooling capacity is reduced and a failure of the rotor is induced, and thus there is a problem in that it is difficult to secure product reliability.

DISCLOSURE

Technical Problem

The present invention is directed to providing an air guide-integrated evaporation cooler in which a plurality of barrier plates, heat exchangers, and air guides for forming a dry channel and a wet channel may be integrally manufactured by a simple process, and a method of manufacturing the same.

The present invention is also directed to providing an air guide-integrated evaporation cooler in which surface areas of a wet channel and a dry channel of a heat exchanger may increase even without manufacturing a fin bent a plurality of times, and a method of manufacturing the same.

The present invention is also directed to providing an air guide-integrated evaporation cooler in which a plate which separates a dry channel from a wet channel of a heat exchanger is formed to be thinner than that of a conventional plate and a sufficient rigidity may also be maintained, and a method of manufacturing the same.

Technical Solution

One aspect of the present invention provides an air guide-integrated evaporation cooler which includes a plurality of barrier plates (10, 20, 30, and 40); and gap units (50 and 60) including a plurality of bars (52 and 62) positioned between the plurality of barrier plates (10, 20, 30, and 40), disposed to be spaced apart from each other at a center portion thereof, and configured to form heat exchangers (54 and 64), and guides (51 and 61) disposed at edges of the plurality of barrier plates (10, 20, 30, and 40) and configured to determine a direction of a fluid flow.

The plurality of barrier plates (10, 20, 30, and 40) may include a first barrier plate, a second barrier plate, and a third barrier plate (10, 20, and 30) which are spaced predetermined distances from each other; a dry channel (DC) through which indoor air and outdoor air flow may be formed between the first barrier plate (10) and the second barrier plate (20); and a wet channel (WC) through which water and exhausted air flow may be formed between the second barrier plate (20) and the third barrier plate (30).

The gap units (50 and 60) may be formed with a first gap unit (50) provided between the first barrier plate (10) and the second barrier plate (20) and a second gap unit (60) provided between the second barrier plate (20) and the third barrier plate (30); and a fluid flow in the first gap unit (50) may be a counterflow of a fluid flow in the second gap unit (60).

A plurality of embossings (11, 21, 31, and 41) may respectively protrude from the barrier plates (10, 20, 30, and 40) in a direction of one side thereof, or some of the plurality of embossings (11, 21, 31, and 41) may respectively protrude from the barrier plates (10, 20, 30, and 40) in a direction of one side thereof and the remainder thereof may respectively protrude from the barrier plates (10, 20, 30, and 40) in a direction of the other side thereof.

Some of the embossings (11, 21, 31, and 41) that protrude toward the dry channel (DC) may have lengths in a direction parallel to a flow direction of the indoor air and the outdoor air.

The embossings (11, 21, 31, and 41) may be in contact with the embossings on another adjacent barrier plate.

Pairs of guides (51 and 61) may be provided at edges of one sides and the other sides of the barrier plates (10, 20, 30, and 40) to be opposite each other, and areas thereof in contact with the barrier plates (10, 20, 30, and 40) may be bonded such that the fluid is introduced through one open sides between the pairs of guides (51 and 61), and the fluid is discharged through the other open sides of the pairs of guides (51 and 61).

The bar (52) may include a plurality of bars spaced predetermined distances in a horizontal direction which is a diagonal direction of the barrier plates (10, 20, 30, and 40), and arranged in parallel.

The guides (51 and 61) and the bars (52 and 62) may be formed of aluminum clad and the outer layers thereof may be formed of aluminum having a melting point lower than that of the inner layers; and the aluminum clad forming the outer layers may be melted by heat, and the guides (51 and 61) and the bars (52 and 62) may be bonded integrally with the barrier plates (10, 20, 30, and 40).

The plurality of bars (52 and 62) may be formed to be hollow in a shape of a pipe with a rectangular cross section, each of one side surfaces and the other side surfaces of the bars (52 and 62) may be in contact and coupled with adjacent barrier plates, and the fluid may flow through spaces (53 and 63) between the adjacent bars (52 and 62) and spaces inside the bars (52 and 62).

Another aspect of the present invention provides a method of manufacturing an air guide-integrated evaporation cooler including a plurality of barrier plates (10, 20, 30, and 40); and gap units (50 and 60) including a plurality of bars (52 and 62) positioned between the plurality of barrier plates (10, 20, 30, and 40), configured to form heat exchangers (54 and 64) by being disposed to be spaced apart from each other at a center portion thereof, and formed with inner layers and outer layers formed of clad, and guides (51 and 61) disposed at edges of the plurality of barrier plates (10, 20, 30, and 40), configured to determine a direction of a fluid flow, and formed inner layers and outer layers formed of clad, the method includes: operation a) providing the plurality of barrier plates (10, 20, 30, and 40), the bars (52 and 62), and the guides (51 and 61); operation b) repeating operations of arranging the bars (52 and 62) and the guides (51 and 61) at an upper portion of one of the plurality of barrier plates (10, 20, 30, and 40), covering the arranged bars (52 and 62) and guides (51 and 61) with the next barrier plates (10, 20, 30, and 40), and arranging the bars (52 and 62) and the guides (51 and 61); and operation c) heating a component provided through the operation b), melting the outer layers having a melting point lower than that of the inner layers of the guides (51 and 61) and the bars (52 and 62), and bonding the barrier plates (10, 20, 30, and 40) to the bars (52 and 62) and the guides (51 and 61).

The guides (51 and 61) and bars (52 and 62) may be formed of aluminum clad.

In the operation b), the guides (51 and 61) and the bars (52 and 62) may be arranged such that flow directions of fluids flowing through the adjacent gap units (50 and 60) with one of the barrier plates (10, 20, 30, and 40) interposed therebetween form counterflow.

Advantageous Effects

An air guide-integrated evaporation cooler can prevent water and air leaks and improve heat exchange efficiency by integrally coupling a plurality of barrier plates and first and second gap units which are air guides between the barrier plates.

As thin barrier plates have a sufficient rigidity by forming embossings on the barrier plates, heat exchange efficiency of a heat exchanger can be improved by using the thin barrier plates.

As surface areas inside a wet channel and a dry channel are increased by using the bars of the first and second gap units, a manufacturing cost can be reduced and productivity can be improved because conventional fins do not need to be manufactured.

Since the barrier plate, the first gap unit, and the second gap unit are bonded to each other by one brazing process, additional components for mechanical coupling are not necessary, a process time can be reduced, and a cost can be reduced.

DESCRIPTION OF DRAWINGS

FIG. 1 is an exploded perspective view illustrating an air guide-integrated evaporation cooler according to an exemplary embodiment of the present invention.

FIG. 2 is a perspective view illustrating a coupled state of the air guide-integrated evaporation cooler shown in FIG. 1.

FIG. 3A is a configuration diagram of a state in which a first barrier plate (10) and a first gap unit (50) shown in FIG. 1 overlap each other, and FIG. 3B is a configuration diagram of a state in which a second barrier plate (20) and the first gap unit (50) shown in FIG. 1 overlap each other.

FIG. 4 is a cross-sectional view taken along line A-A shown in FIG. 3A.

FIG. 5 is a configuration diagram illustrating a third barrier plate (30) and a second gap unit (60) shown in FIG. 1.

FIG. 6 is a configuration diagram of another embodiment of the present invention.

FIG. 7 is a flowchart of a manufacturing process of the air guide-integrated evaporation cooler according to an exemplary embodiment of the present invention.

REFERENCE NUMERALS

| | |
|---|---|
| 10: | FIRST BARRIER PLATE |
| 20: | SECOND BARRIER PLATE |
| 30: | THIRD BARRIER PLATE |
| 40: | FOURTH BARRIER PLATE |
| 50: | FIRST GAP UNIT |
| 60: | SECOND GAP UNIT |
| 11, 21, 31, 41: | EMBOSSING |
| 51, 61: | GUIDE |
| 52, 62: | BAR |

MODES OF THE INVENTION

Hereinafter, an air guide-integrated evaporation cooler and a method of manufacturing the same according to the present invention will be described in detail with reference to the accompanying drawings.

FIG. 1 is an exploded perspective view illustrating an air guide-integrated evaporation cooler according to an exemplary embodiment of the present invention, and FIG. 2 is a perspective view illustrating a coupled state of the air guide-integrated evaporation cooler shown in FIG. 1. Referring to FIGS. 1 and 2, an air guide-integrated evaporation cooler 100 according to the exemplary embodiment of the present invention includes first to fourth barrier plates 10, 20, 30, and 40, a pair of first gap units 50 each interposed between the first barrier plate 10 and the second barrier plate 20 and between the third barrier plate 30 and the fourth barrier plate 40 and configured to determine flow directions of fluids in a heat exchanger of a dry channel DC and the dry channel DC, and a second gap unit 60 positioned between the second barrier plate 20 and the third barrier plate 30 and configured to determine flow directions of fluids in a heat exchanger of a wet channel WC and the wet channel WC.

Each of the first to fourth barrier plates 10, 20, 30, and 40 has a shape of a thin plate and an overall octagonal shape after vertex portions of a rhombus shape have been cut. Such first to fourth barrier plates 10, 20, 30, and 40 have small thicknesses, and pluralities of embossings 11, 21, 31, and 41 are respectively formed on the first to fourth barrier plates 10, 20, 30, and 40 in one or both directions to prevent the first to fourth barrier plates 10, 20, 30, and 40 from being deformed due to the small thickness thereof.

Although shapes of the first gap unit 50 and the second gap unit 60 selectively inserted between the first to fourth barrier plates 10, 20, 30, and 40 are similar to each other, there is a difference in that the first gap unit 50 and the second gap unit 60 provides paths through which air flows in diagonal directions opposite to each other (that is, counterflow directions) when positioned between the first to fourth barrier plates 10, 20, 30, and 40.

That is, there is a difference in the shapes of the first gap unit 50 and the second gap unit 60 such that a flow direction of air which passes through the dry channel DC formed with the first barrier plate 10, the first gap unit 50, and the second barrier plate 20 is a direction from a lower left side toward an upper right side in the drawing, and a flow direction of water and exhausted air which pass through the wet channel WC is a direction from an upper left side toward a lower right side thereof.

Indoor air and outdoor air are mixed and pass through the dry channel DC, some of the air which passed through the dry channel DC is exhausted to the outside through the wet channel WC wetted by water, and thus the water is induced to be evaporated. When the water evaporates from a surface of the wet channel WC, the surface of the wet channel WC is cooled and absorbs heat from air which passes through the dry channel DC, and thus the air which passed through the dry channel DC is cooled and supplied to an interior. Air exhausted to the outside through the wet channel WC may also be formed as indoor air introduced through a path different from the dry channel DC.

FIG. 3A is a configuration diagram of a state in which the first barrier plate 10 and the first gap unit 50 shown in FIG. 1 overlap each other, and FIG. 3B is a configuration diagram of a state in which the second barrier plate 20 and the first gap unit 50 shown in FIG. 1 overlap each other.

The dry channel DC provided at one side of the wet channel WC is formed with the first barrier plate 10, the first gap unit 50, and the second barrier plate 20.

The first gap unit 50 is formed with a pair of guides 51 (51a and 51b) configured to determine a direction in which air flows, a plurality of bars 52 separated from the guides 51, spaced predetermined distances from each other in a horizontal direction which is a diagonal direction of the first barrier plate 10, and arranged in parallel.

Referring to FIGS. 3A, 1, and 2, the pair of guides 51a and 51b of the first gap unit 50 forming a part of the dry channel DC are positioned to be opposite each other at a perimeter of an edge of the first barrier plate 10 in the drawings such that lower left and upper right sides thereof are open.

The guide 51a positioned at one side in the first gap unit 50 is formed with a guide body 51-1a, a first guide extension 51-2a which extends from an upper end of the guide body 51-1a, and a second guide extension 51-3a which extends from a lower end of the guide body 51-1a.

The guide body 51-1a is obliquely formed to have a length the same as that of an upper left side of the second barrier plate 20 in an octagonal shape.

The first guide extension 51-2a is bent and extends from the upper end of the guide body 51-1a in a horizontal direction to have a length the same as that of an upper side of the second barrier plate 20.

The second guide extension 51-3a is bent and extends downward from the lower end of the guide body 51-1a to have a length the same as that of a left side of the second barrier plate 20, and positioned at a side of the plurality of bars 52.

The guide 51b positioned at the other side in the first gap unit 50 has a shape the same as that of the guide 51a positioned at the one side in the first gap unit 50, and is formed with a guide body 51-1b positioned to be opposite the guide body 51-1a, a first guide extension 51-2b positioned to be opposite the first guide extension 51-2a, a second guide extension 51-3b positioned to be opposite the second guide extension 51-3a.

In addition, in such a structure, air introduced through an inclined opening DCI positioned at a lower left side moves upward through a dry channel heat exchanger 54 formed with the plurality of bars 52 and spaces 53 therebetween. Here, the dry channel heat exchanger 54 is in contact with a heat exchanger 64 of the wet channel WC to exchange heat, and air which passes through the dry channel heat exchanger 54 is cooled by the heat exchange. The air cooled by the dry channel heat exchanger 54 is discharged to the interior through an opening DCO positioned at an upper right side of the first and second barrier plates 10 and 20 for cooling the interior.

Each of the bars 52 may be formed to be hollow in the shape of a pipe with a rectangular cross section. One side surface of the bar 52 is in contact and coupled with the first barrier plate 10 and the other side surface is in contact and coupled with the second barrier plate 20. Air which passes through the dry channel DC flows through the spaces 53 between the adjacent bars 52 and spaces inside the hollow bars 52. The bars 52 may facilitate heat exchange by increasing a surface area of the dry channel heat exchanger 54, in place of a conventional fin.

The embossings 11 and 21, which are parallel to an air flow direction of the dry channel DC and have predetermined lengths, are formed on the first barrier plate 10 and the second barrier plate 20 forming a part of the dry channel DC of such a structure described above. The embossings 11 and 21 provide rigidity by which the shapes of the first barrier plate 10 and the second barrier plate 20 as described above as well as the air flow paths may be maintained.

Heights of the embossings 11 and 21 of the first barrier plate 10 and the second barrier plate 20 may be half the protruding heights of the bars 52 and the guides 51, an end of the embossing 11 of the first barrier plate 10 and an end of the embossing 21 of the second barrier plate 20 may be in contact with each other.

The embossings 11 and 21 are respectively formed on the first barrier plate 10 and the second barrier plate 20 in plurality, and the embossings 11 and 21 are vertically disposed when installed.

In this case, the plurality of the embossings 11 and 21 may protrude in one directions of the first barrier plate 10 and the second barrier plate 20 and may also protrude in both directions thereof.

When the plurality of the embossings 11 and 21 protrude in one direction, all the plurality of embossings 11 formed on the first barrier plate 10 may protrude rightward from a right-side surface thereof, and all the plurality of embossings 21 formed on the second barrier plate 20 may protrude leftward from a left side surface thereof.

When the plurality of the embossings 11 and 21 protrude in both directions, some of the plurality of embossings 11 formed on the first barrier plate 10 may protrude rightward, the remaining embossings 11 may protrude leftward, some of the plurality of embossings 21 formed on the second barrier plate 20 may protrude rightward, and the remaining embossings 21 may protrude leftward. As described above, protruding directions of the pluralities of embossings 11 and 21 may be different from each other, and upper and lower embossings 11 and 21 may also alternately protrude up and down.

When the plurality of embossings 11 and 21 protrude in both directions, and the barrier plates 10, 20, 30, and 40 serially overlap each other, the embossings 11, 21, 31, and 41 which protrude leftward and rightward are in contact with each other and form spaces.

Although the embossings 11 and 21 having short lengths are illustrated in the drawings, the embossings 11 and 21 may have a long rectangular structure of which both ends are positioned at two sides at which the first and second barrier plates 10 and 20 face each other.

Although the embossings 11 and 21 formed on the first barrier plate 10 and the second barrier plate 20 have been described in the above description, the embossings 31 and 41 respectively formed on the third barrier plate 30 and the fourth barrier plate 40 are formed in shapes the same as those of the embossings 11 and 21.

FIG. 4 is a cross-sectional view taken along line A-A shown in FIG. 3A.

Referring to FIG. 4, some of embossings 11 and 21 protruding from the first barrier plate 10 and the second barrier plate 20 in directions to face each other are in contact with each other, and although not illustrated in the drawing, the other embossings 11 and 21 protruding in directions opposite each other are spaced apart from each other and form spaces.

The pair of guides 51 (51a and 51b) are positioned at an edge between the first barrier plate 10 and the second barrier plate 20 to prevent air from leaking, and guide air to flow in a predetermined direction (from the DCI to the DCO).

As described above, in the present invention, the dry channel DC positioned at one side of the air guide-integrated evaporation cooler 100 may be formed by using the first barrier plate 10, the first gap unit 50, and the second barrier plate 20. A portion at which the bars 52 are positioned in the first barrier plate 10 and the second barrier plate 20 is the heat exchanger 54, and the remaining portion thereof is air guides 55 and 56 in which a direction of an air flow is determined by the guides 51.

That is, in the present invention, the heat exchanger 54 and the air guides 55 and 56 respectively provided above and below the heat exchanger 54 may be integrally formed.

FIG. 5 is a configuration diagram illustrating the third barrier plate 30 and the second gap unit 60 shown in FIG. 1.

Referring to FIG. 5, the wet channel WC is formed with the second barrier plate 20, the second gap unit 60, and the third barrier plate 30. Water and exhausted air are introduced from an upper left side of the wet channel WC, the water evaporates, the second barrier plate 20, the third barrier plate 30, and the second gap unit 60 are cooled, and thus air which passes through the dry channel DC is cooled.

The second gap unit 60 is formed with a pair of guides 61 (61a and 61b) configured to determine a direction in which air flows and a plurality of bars 62 separated from the guides 61, spaced predetermined distances from each other in a horizontal direction which is a diagonal direction of the second barrier plate 20, and arranged in parallel.

The guide 61a which is positioned at one side in the second gap unit 60 is formed with a guide body 61-1a, a first guide extension 61-2a which extends from an upper end of the guide body 61-1a, and a second guide extension 61-3a which extends from a lower end of the guide body 61-1a.

The guide body 61-1a is obliquely formed to have a length the same as that of an upper right side of the third barrier plate 30 formed in an octagonal shape.

The first guide extension 61-2a is bent and extends from an upper end of the guide body 61-1a in a horizontal direction to have a length the same as that of an upper side of the third barrier plate 30.

The second guide extension 61-3a is bent and extends downward from a lower end of the guide body 61-1a to have a length the same as that of a right side of the third barrier plate 30, and positioned at a side of the plurality of bars 62.

The guide 61b positioned at the other side of the second gap unit 60 has a shape the same as that of the guide 61a positioned at the one side of the second gap unit 60, and is formed with a guide body 61-1b positioned to be opposite the guide body 61-1a, a first guide extension 61-2b positioned to be opposite the first guide extension 61-2a, and a second guide extension 61-3*b* positioned to be opposite the second guide extension 61-3*a*.

The bars 62 are spaced predetermined distances from each other in a horizontal direction which is a diagonal direction of the second barrier plate 20 and the same direction of the bars 52 of the first gap unit 50 forming the dry channel DC, and are arranged in parallel.

Each of the bars 62 may be formed to be hollow in the shape of a pipe with a rectangular cross section. One side surface of the bar 62 is in contact and coupled with the second barrier plate 20 and the other side surface is in contact and coupled with the third barrier plate 30. Water and exhausted air which passes through the wet channel WC flows through spaces 63 between the adjacent bars 62 and spaces inside the hollow bars 62. The bars 62 may facilitate heat exchange by increasing a surface area of the wet channel heat exchanger 64, in place of a conventional fin.

Because water and exhausted air supplied to the wet channel WC should be completely separated from the dry channel DC, the guides 61 of the second gap unit 60 are provided to be in contact with a perimeter of an edge of the second barrier plate 20 such that an upper left side and a lower right side in the drawing are open.

In such a structure, water and exhausted air are supplied through an upper left opening WCI, move downward through the heat exchanger 64 which is the spaces 63 between the bars 62, and are discharged to the outside through a lower right opening WCO.

Some of the embossings 31 formed on the third barrier plate 30 may also protrude rightward and the remaining embossings 31 may also protrude leftward as in the embossings 21 of the second barrier plate 20.

When the embossings 21 of the second barrier plate 20 and the embossings 31 of the third barrier plate 30 protrude in directions to face each other and are in contact with each other, a space may be formed between the second barrier plate 20 and the third barrier plate 30, water may be guided to flow toward upper ends of the bars 62 by the embossings 21 and 31 and is thus evaporated uniformly.

Directions in which the plurality of embossings 31 protrude may also be different from each other, and the upper and lower embossings 31 may be also formed to alternately protrude up and down.

The heat exchanger 64 is formed at a position, with which the bars 62 of the second gap unit 60 are in contact, in the second barrier plate 20, the second gap unit 60, the third barrier plate 30 forming the wet channel WC as described above, and air guides 65 and 66 configured to determine flow directions of water and exhausted air are formed at another position, the heat exchanger 64 and the air guides 65 and 66 may be integrally formed, and thus water and air are prevented from leaking therebetween.

Flow directions of a fluid are 180 degrees opposite each other in the heat exchangers 54 and 64 of the wet channel WC and the dry channel DC, and are perpendicular in the air guides 55, 56, 65, and 66, and thus overall flows of counterflow are generated. In addition, as the wet channel WC and the dry channel DC prevent water and air leaks by which fluids are mixed and introduced into the counterflow, heat exchange efficiency may increase. The reason is that high temperature outdoor air which passes through the dry channel DC is prevented from being introduced to the lower temperature wet channel WC.

The second barrier plate 20, the second gap unit 60, and the third barrier plate 30 form the wet channel WC, and a first gap unit 50 in contact with a surface of the third barrier plate 30 opposite the second gap unit 60 and the fourth barrier plate 40 form another dry channel DC.

That is, the present invention may have a structure in which the wet channel WC is positioned at a center thereof and dry channels DC are provided at both side surfaces of the wet channel WC, and may be formed with the structure in which a plurality of wet channels WC and dry channels DC are alternately and repeatedly disposed.

In addition, the present invention may have a structure in which the dry channel DC and the wet channel WC are a pair, that is, the dry channel DC is formed at only one side surface of the wet channel WC, and the structure is formed with the first barrier plate 10, the first gap unit 50, the second barrier plate 20, the second gap unit 60, and the third barrier plate 30 in the above drawings.

In addition, positions of the dry channel DC and the wet channel WC may also be changed from the above examples. In this case, the wet channels WC are positioned at both side surfaces of the dry channel DC.

All of the first to fourth barrier plates 10, 20, 30, and 40, the first gap unit 50, the second gap unit 60 may be formed of an aluminum material, and particularly, the second barrier plate 20, the third barrier plate 30, and the second gap unit 60 forming the wet channel WC may be surface-treated with a hydrophilic material and used such that water is easily spread on surfaces thereof.

The first gap unit 50 and the second gap unit 60 may be formed of an aluminum material. In this case, since inner layers of the guides 51 and 61 and the bars 52 and 62 are formed of a 3000 series aluminum and outer layers thereof are formed of a 4000 series aluminum clad having a low melting point, the first gap unit 50 and the second gap unit 60 may be integrally manufactured by single brazing.

FIG. 6 is a configuration diagram of another embodiment of the present invention, and the air guide-integrated evaporation cooler 100 according to the above-described present invention is manufactured in plurality, and an air guide-integrated evaporation cooler 200 which has a large capacity may be manufactured by coupling the air guide-integrated evaporation coolers 100 to each other.

In this case, brazing in which adhesives are heated at a predetermined temperature for bonding may be used as a method of coupling the air guide-integrated evaporation coolers 100 to each other.

FIG. 7 is a flowchart of a manufacturing process of the air guide-integrated evaporation cooler according to an exemplary embodiment of the present invention, and a manufacturing method of the air guide-integrated evaporation cooler 100 according to the exemplary embodiment of the present invention will be described with reference to FIG. 7 and the above-described FIGS. 1 to 5.

First, the first to fourth barrier plates 10, 20, 30, and 40 having the same shape are manufactured (operation S10).

As illustrated in FIGS. 1 to 5, the first to fourth barrier plates (10, 20, 30, and 40) are manufactured to have an octagonal shape after vertex portions of a rhombus shape have been cut (operation S10). Here, the first to fourth barrier plates 10, 20, 30, and 40 may be manufactured by using various methods, and the embossings 11, 21, 31, and 41 are also formed in a diagonal direction.

Next, the guides 51 and 61 which are in contact with a part of each edge of the first to fourth barrier plates 10, 20, 30, and 40 and determine a direction of a fluid flow are manufactured (operation S20).

Although it has been described that the guides 51 and 61 respectively form the dry channel DC and the wet channel WC according to applications, shapes thereof are the same.

For the sake of convenience in the description, although operation S20 is separately described from operation S10, operation S20 may be simultaneously performed with the operation S10.

Next, the bars 52 and 62 for forming the heat exchangers 54 and 64 are manufactured (operation S30). Operation S30 may also be simultaneously performed with operation S10 and operation S20.

Operations S40 to S60 are processes of stacking the components provided in operations S10 to S30.

First, the pair of guides 51a and 51b and the plurality of bars 52 positioned between the pair of guides 51a and 51b are arranged at the upper portion of the first barrier plate 10, and the dry channel DC is formed by covering the upper portion of the first barrier plate 10 with the second barrier plate 20 (operation S40).

Next, the pair of guides 61a and 61b and the plurality of bars 62 are arranged at an upper portion of the second barrier plate 20 such that the guides 61a and the 61b are arranged in a mirror direction which is rotated 180 degrees with respect to an arrangement of the guide 51a and 51b, and the wet channel WC is formed by covering the upper portion of the second barrier plate 20 with the third barrier plate 30 (operation S50).

Next, the pair of guides 51a and 51b and the plurality of bars 52 are arranged at an upper portion of the third barrier plate 30 such that an arrangement thereof is the same as that of the arrangement of the guides 51a and 51b and the plurality of bars 52 arranged at the upper portion of the first barrier plate 10, and the dry channel DC is formed by covering the upper portion of the third barrier plate 30 with the fourth barrier plate 40 (operation S60).

The first barrier plate 10, the first gap unit 50, the second barrier plate 20, the second gap unit 60, the third barrier plate 30, the first gap unit 50, and the fourth barrier plate 40 are sequentially stacked as described above. In this case, the first gap unit 50 and the second gap unit 60 includes the bars 52 and 62 forming the heat exchangers 54 and 64 at the same positions, and the guides 51 and 61 disposed such that flow directions of fluids are diagonal directions to each other (opposite directions at portions of the heat exchangers, and perpendicular directions at portions of the air guides).

The components provided through operation S60 are input to a heating furnace and coupled to each other by brazing (operation S70).

That is, when the components provided through operation S60 are heated at a predetermined temperature, the outer layers of the guides 51 and 61 and the bars 52 and 62 formed of a 4000 series aluminum having a low melting point are melted, and thus the first to fourth barrier plates 10, 20, 30, and 40 are bonded.

Accordingly, in the present invention, the barrier plates 10, 20, 30, and 40 and the gap units 50 and 60 are not mechanically coupled, but are integrally bonded by single brazing, and thus a manufacturing process is simple.

In addition, because a fluid is not leaked between the barrier plates 10, 20, 30, and 40 and the gap units 50 and 60, and additional mechanical units for coupling are not used, a volume thereof decreases and an increase in a manufacturing cost can be prevented.

The present invention is not limited to the above-described embodiments, and it is clear to those skilled in the art that the present invention can be variously modified, changed, and performed without departing from the technological scope of the present invention.

The invention claimed is:
1. An air guide-integrated evaporation cooler comprising:
a plurality of barrier plates; and
gap units including a plurality of bars positioned between the plurality of barrier plates, disposed to be spaced apart from each other at a center portion thereof, and configured to form heat exchangers, and guides disposed at edges of the plurality of barrier plates and configured to determine a direction of a fluid flow,
wherein a counterflow is formed in two adjacent gap units of the gap units with one barrier plate of the plurality of barrier plates interposed therebetween.

2. The air guide-integrated evaporation cooler of claim 1, wherein the plurality of barrier plates include a first barrier plate, a second barrier plate, and a third barrier plate which are spaced predetermined distances from each other;
a dry channel is formed between the first barrier plate and the second barrier plate, wherein indoor air and outdoor air flow through the dry channel; and
a wet channel is formed between the second barrier plate and the third barrier plate, wherein water and exhausted air flow through the wet channel.

3. The air guide-integrated evaporation cooler of claim 2, wherein the gap units are formed with a first gap unit provided between the first barrier plate and the second barrier plate and a second gap unit provided between the second barrier plate and the third barrier plate; and
a fluid flow in the first gap unit is the counterflow of a fluid flow in the second gap unit.

4. The air guide-integrated evaporation cooler of claim 2, wherein a plurality of embossings respectively protrude from the barrier plates in a direction of one side thereof; or
some of the plurality of embossings respectively protrude from the barrier plates in a direction of one side thereof and the remainder thereof respectively protrude from the barrier plates in a direction of the other side thereof.

5. The air guide-integrated evaporation cooler of claim 4, wherein some of the embossings that protrude toward the dry channel (DC) have lengths in a direction parallel to a flow direction of the indoor air and the outdoor air.

6. The air guide-integrated evaporation cooler of claim 4, wherein the embossings are in contact with the embossings on another adjacent barrier plate.

7. The air guide-integrated evaporation cooler of claim 1, wherein pairs of guides are provided at edges of one sides and the other sides of the barrier plates to be opposite each other, and areas thereof in contact with the barrier plates are bonded such that the fluid is introduced through one open sides between the pairs of guides, and the fluid is discharged through the other open sides of the pairs of guides.

8. The air guide-integrated evaporation cooler of claim 7, wherein the bar includes a plurality of bars spaced predetermined distances in a horizontal direction, which is a diagonal direction of the barrier plates, and arranged in parallel.

9. The air guide-integrated evaporation cooler of claim 1, wherein the guides and the bars are formed of aluminum clad and the outer layers thereof are formed of aluminum having a melting point lower than that of the inner layers; and
the aluminum clad forming the outer layers is melted by heat, and the guides and the bars are integrally bonded to the barrier plates.

10. The air guide-integrated evaporation cooler of claim 1, wherein the plurality of bars are formed to be hollow in a shape of a pipe with a rectangular cross section;

each of one side surfaces and the other side surfaces of the bars is in contact and coupled with adjacent barrier plates; and the fluid flows through spaces between the adjacent bars and spaces inside the bars.

11. A method of manufacturing an air guide-integrated evaporation cooler, wherein the air guide-integrated evaporation cooler comprises:

a plurality of barrier plates; and gap units including a plurality of bars positioned between the plurality of barrier plates, configured to form heat exchangers by being disposed to be spaced apart from each other at a center portion thereof, and formed with inner layers and outer layers formed of clad, and guides disposed at edges of the plurality of barrier plates, configured to determine a direction of a fluid flow, and formed inner layers and outer layers formed of clad, the method comprising:

operation a) providing the plurality of barrier plates, the bars, and the guides;

operation b) repeating operations of arranging the bars and the guides at an upper portion of one of the plurality of barrier plates, covering the arranged bars and guides with the next barrier plates, and arranging the bars and the guides; and operation c) heating a component provided through the operation b), melting the outer layers having a melting point lower than that of the inner layers of the guides and the bars, and bonding the barrier plates to the bars and the guides, wherein, in the operation b), the guides and the bars are arranged such that flow directions of fluids flowing through the adjacent gap units with one of the barrier plates interposed therebetween form counterflow.

12. The method of claim 11, wherein the guides and bars are formed of aluminum clad.

* * * * *